(12) United States Patent
Hassan

(10) Patent No.: US 8,588,728 B1
(45) Date of Patent: Nov. 19, 2013

(54) METHOD AND APPARATUS FOR ENHANCED ADAPTIVE IDLE MODE AND BATTERY EFFICIENCY MONITORING

(75) Inventor: Kafi I Hassan, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 150 days.

(21) Appl. No.: 13/161,996

(22) Filed: Jun. 16, 2011

(51) Int. Cl.
*H04B 1/16* (2006.01)

(52) U.S. Cl.
USPC ..... 455/343.2; 455/458; 455/515; 455/343.1; 455/343.4

(58) Field of Classification Search
USPC ........ 455/343.1–343.6, 117, 127.1, 230, 298, 455/575, 574, 426.1, 458, 515
See application file for complete search history.

(56) References Cited

U.S. PATENT DOCUMENTS

| | | | | |
|---|---|---|---|---|
| 5,301,354 A * | 4/1994 | Schwendeman et al. | ..... | 455/13.1 |
| 5,471,655 A * | 11/1995 | Kivari | ......................... | 455/127.5 |
| 5,950,131 A * | 9/1999 | Vilmur | .......................... | 455/434 |
| 6,044,069 A * | 3/2000 | Wan | ............................... | 370/311 |
| 6,377,798 B1 * | 4/2002 | Shaffer et al. | .............. | 455/426.1 |
| 6,724,738 B1 * | 4/2004 | Storm et al. | ................... | 370/320 |
| 7,676,214 B2 | 3/2010 | Homchaudhuri | | |
| 8,090,380 B2 * | 1/2012 | Islam et al. | .................... | 455/450 |
| 2001/0009544 A1 * | 7/2001 | Vanttinen et al. | ............. | 370/338 |
| 2003/0051674 A1 * | 3/2003 | Leblanc | ......................... | 119/220 |
| 2004/0151231 A1 * | 8/2004 | Li et al. | .......................... | 375/146 |
| 2005/0100082 A1 * | 5/2005 | Ma | ................................. | 375/148 |
| 2005/0253703 A1 * | 11/2005 | He et al. | .................... | 340/539.13 |
| 2006/0135073 A1 * | 6/2006 | Kurapati et al. | ........... | 455/67.11 |
| 2006/0160558 A1 * | 7/2006 | Kim et al. | ...................... | 455/522 |
| 2007/0117575 A1 * | 5/2007 | Courau et al. | ................ | 455/458 |
| 2007/0155441 A1 | 7/2007 | Carbonaro | | |
| 2007/0197219 A1 * | 8/2007 | Ryu et al. | ....................... | 455/434 |
| 2007/0254677 A1 * | 11/2007 | Venkitaraman et al. | ...... | 455/458 |
| 2008/0095092 A1 * | 4/2008 | Kim | .............................. | 370/311 |
| 2008/0153491 A1 * | 6/2008 | Cho et al. | ................... | 455/435.1 |
| 2008/0311933 A1 * | 12/2008 | Lim et al. | ..................... | 455/458 |
| 2009/0221284 A1 * | 9/2009 | Kim et al. | ................... | 455/426.1 |
| 2009/0298516 A1 * | 12/2009 | Ryu et al. | ..................... | 455/458 |
| 2010/0041399 A1 * | 2/2010 | Kim et al. | ..................... | 455/434 |
| 2010/0062772 A1 * | 3/2010 | Peng et al. | ..................... | 455/436 |
| 2010/0105449 A1 * | 4/2010 | Shi et al. | ...................... | 455/574 |
| 2010/0159960 A1 * | 6/2010 | Chou et al. | .................... | 455/458 |
| 2010/0165899 A1 * | 7/2010 | Van Bosch et al. | ........... | 370/311 |
| 2010/0184458 A1 * | 7/2010 | Fodor et al. | ................... | 455/522 |
| 2010/0248768 A1 * | 9/2010 | Nakatsugawa | ................ | 455/509 |
| 2010/0302980 A1 * | 12/2010 | Ji et al. | .......................... | 370/311 |
| 2010/0316007 A1 * | 12/2010 | Son et al. | ...................... | 370/329 |
| 2011/0051668 A1 * | 3/2011 | Lee et al. | ...................... | 370/328 |
| 2011/0053617 A1 * | 3/2011 | Lee et al. | ...................... | 455/458 |
| 2011/0153855 A1 * | 6/2011 | Kim | .............................. | 709/229 |
| 2011/0201354 A1 * | 8/2011 | Park et al. | .................. | 455/456.1 |

* cited by examiner

*Primary Examiner* — Dominic E Rego

(57) ABSTRACT

A method and apparatus to manage the paging cycle of a communication device are disclosed. The method includes receiving, by an element of a communication system, at least one message comprising an idle mode request, a battery charge level of a battery of the communication device, and a desired paging information from the communication device, from the communication device, determining a paging information for the communication device based on the battery charge level by selecting a first paging cycle when the battery charge level meets a charge level criteria and selecting a second paging cycle when the battery charge levels does not meet the charge level criteria, the second paging cycle being longer than the first paging cycle, and transmitting a response message comprising the determined paging information to the communication device.

19 Claims, 6 Drawing Sheets

METHOD AND APPARATUS FOR ENHANCED ADAPTIVE IDLE MODE AND BATTERY EFFICIENCY MONITORING

TECHNICAL BACKGROUND

Wireless communication systems have become an important means by which many people worldwide have come to communicate. A wireless communication system may provide communication for a plurality of wireless devices, each of which may be serviced through one or more access nodes of the communication system.

Nowadays, many wireless devices are designed to perform tasks beyond voice communications, such as internet browsing, calendar applications, email applications, navigation applications, and even user-generated applications. To perform these and other tasks, wireless devices require increased processing power and the capability to communicate wirelessly at increasingly higher rates. Increased processing power and increased wireless data rates generally increases power consumption of limited battery power, and thus, wireless devices must optimize their battery power usage.

One way of reducing battery power usage of a communication device is by setting the device to idle mode when the communication device is not engaged in a communication session, and remaining in idle mode for as long as possible. However, the period of time a communication device remains in idle mode is set by the communication system and does not take into consideration the battery charge level of the communication device.

OVERVIEW

A method of managing the paging cycle of a communication device is disclosed. The method includes receiving, by an element of a communication system, at least one message comprising an idle mode request, a battery charge level of a battery of the communication device, and a desired paging information from the communication device, from the communication device, determining a paging information for the communication device based on the battery charge level, and transmitting, by the element of the communication system, a response message comprising the determined paging information to the communication device.

Determining the paging information for the communication device of the above method includes selecting a first paging cycle when the battery charge level meets a charge level criteria and selecting a second paging cycle when the battery charge levels does not meet the charge level criteria, and the second paging cycle is longer than the first paging cycle.

Another method of managing the paging cycle of a communication device is discloses. The method includes receiving, by an element of a communication system, at least one message comprising an idle mode request and a desired paging information from the communication device, from the communication device, retrieving, by the element of the communication system, a battery charge level of the communication device recorded at a previous time from a database of the communication system, determining, by the element of the communication system, a paging information for the communication device based on the battery charge level of the communication device, and transmitting, by the element of the communication system, a response message comprising the determined paging information to the communication device.

Determining the paging information for the communication device of the above method includes determining an updated battery charge level of the of the communication device based on the battery charge level of the communication device recorded at the previous time and a difference between the previous time and the current time, selecting a first paging cycle when the battery charge level meets a charge level criteria, and selecting a second paging cycle when the battery charge levels does not meet the charge level criteria, wherein the second paging cycle is longer than the first paging cycle.

An element of a communication system is disclosed. The element includes a communication interface configured to communicate with a communication device and a processing unit, coupled to the communication interface, configured to receive at least one message comprising an idle mode request and a desired paging information from the communication device, from the communication device, determine a paging information for the communication device based on a battery charge level of the communication device, and transmitting through the communication interface a response message comprising the determined paging information to the communication device.

Determining the paging information for the communication device by the above element includes selecting a first paging cycle when the battery charge level meets a charge level criteria and selecting a second paging cycle when the battery charge levels does not meet the charge level criteria, and the second paging cycle is longer than the first paging cycle.

DETAILED DESCRIPTION

The foregoing general description, the following detailed description, and the accompanying drawings, are exemplary and explanatory only and are not restrictive of the present teachings, as claimed. The following detailed description and accompanying drawings set forth the best mode of the present teachings. For the purpose of teaching inventive principles, some aspects of the best mode may be simplified or omitted where they would be known to those of ordinary skill in the art.

The appended claims specify the scope of the present teachings. Some aspects of the best mode may not fall within the scope of the present teachings as specified by the claims. Thus, those skilled in the art will appreciate variations from the best mode that fall within the scope of the present teachings. Those skilled in the art will also appreciate that the features described below can be combined in various ways to form multiple variations of the present teachings. As a result, the present teachings are not limited to the specific examples described below, but only by the claims and their equivalents.

Figure 1:
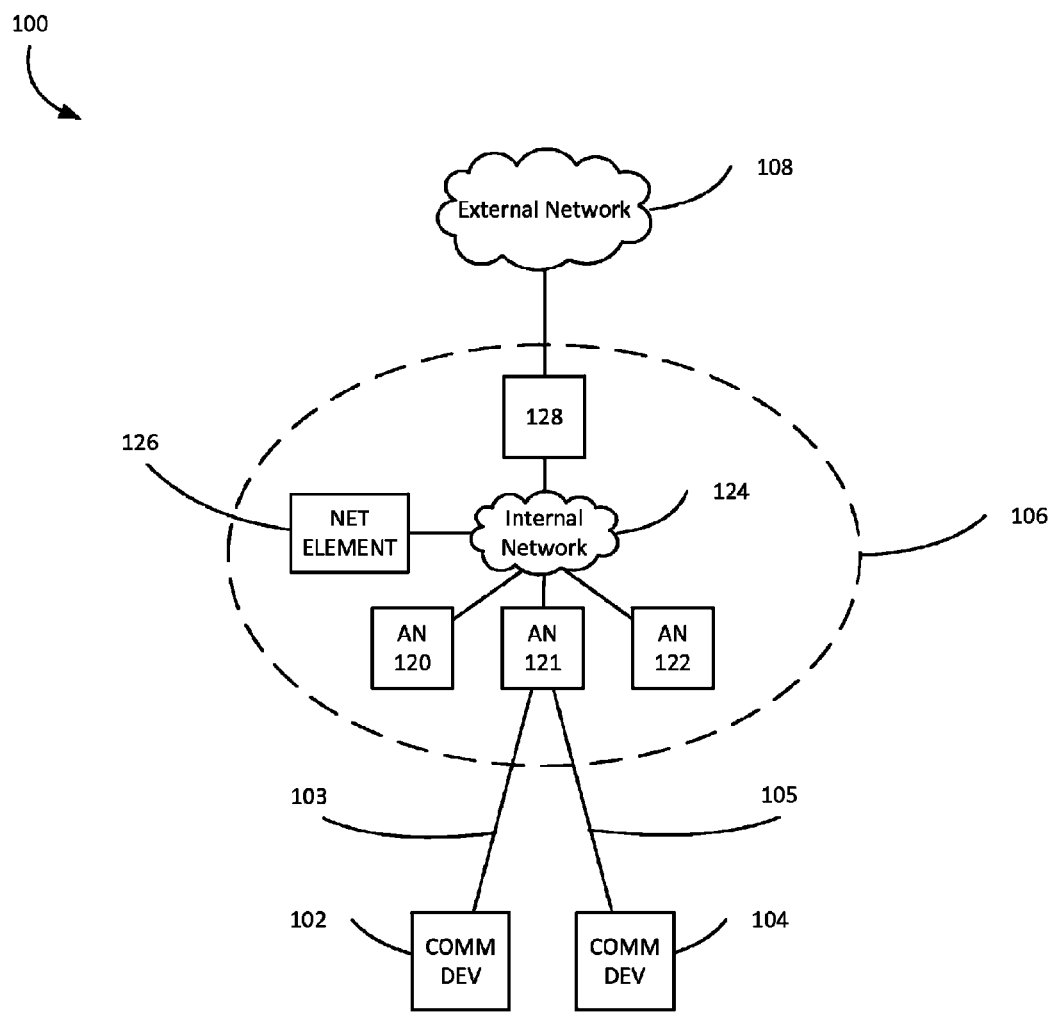
FIG. 1 includes a schematic diagram of an exemplary embodiment of the present teachings.

FIG. 1 illustrates communication environment 100 depicting certain aspects of the present teachings. Communication environment 100 comprises communication devices 102 and 104, communication system 106, and external network 108. Communication system 106 comprises access nodes 120-122, access network 124, network element 126, and network gateway 128.

Communication system 106 provides wireless communication services to communication devices 102 and 104, and may be implemented using one or more wireless communication protocols, such as integrated Digital Enhanced Network (iDEN), Code Division Multiple Access (CDMA), Evolution Data Only (EVDO), Worldwide Interoperability for Microwave Access (WiMAX), Global System for Mobile Communication (GSM), Long Term Evolution (LTE), Wireless Fidelity (WIFI), High Speed Packet Access (HSPA), or some other communication format. Communication system 106 may provide half-duplex voice service, full-duplex voice service, and/or circuit switch/packet data service to communication devices 102 and 104.

Communication devices 102 and 104 may include any electronic device that may be used for voice and/or data communication over a wireless communication system. Examples of communication devices 102 and 104 include, but are not limited to, cellular phones, smart phones, personal digital assistants (PDAs), handheld devices, wireless modems, laptop computers, and personal computers. Communication devices 102 and 104 may communicate with access node 106 over wireless links 103 and 105, respectively. Wireless links 103 and 105 may use the air or space as their transport media and may carry data using various protocols, such as iDEN, CDMA, EVDO, WiMAX, GSM, LTE, WIFI, HSPA, or some other wireless communication format. Communication devices 102 and 104 may be subscribers of communication system 106 or may be subscribers of another communication system (not shown) and capable of roaming into (and being served by) communication system 106.

An access node of access nodes 120-122 may include an access node radio and control equipment contained in a base transceiver station (BTS), or cell site. However, an access node according to the present teachings is not so limited and may be configured differently. Although, for simplicity, communication system 106 is shown as including three access nodes (120-122), those of ordinary skill in the art will appreciate that communication system 106 may include more or less access nodes.

An access node of access nodes 120-122 may be used to provide a link between communication system 106 and communication devices 102 and 104, and may further provide connectivity between communication devices 102 and 104 and external network 108. The external network 108 may be the Internet, a wide area network (WAN), a local area network (LAN), an intranet, another carrier network, or some other type of communications network.

Connectivity between elements of communication system 106 is depicted for simplicity as internal network 124, but the present teachings are not so limited, and communication between elements of communication system 106 may include direct links, or intermediate networks, systems, or devices. Connectivity between the elements of communication system 106 may include links comprising metal, glass, air, space, or some other material as the transport media and communication therein may be realized through communication protocols such as Internet Protocol (IP), Ethernet, or some other communication format—including combinations thereof. Internal network 124 may comprise a router, a computer system, or any other element capable of interconnecting multiple devices.

Network element 126 provides functionality to determine paging information for communication devices 102 and 104. Although Network element 126 is illustrated as a stand-alone element, its functionality may be integrated in one or more other elements of communication system 106.

Network gateway 128 may be any element which provides a gateway between the internal network 124 and an external network 108. Network gateway 128 may aggregate subscriber and control traffic from access nodes within a communication system, provide subscriber management functions, perform network optimization, and forward subscriber traffic as necessary. In an exemplary embodiment, a network gateway 128 may be realized by an access service network (ASN) gateway of a WiMAX-based communication system, but the present teachings are not so limited.

Figure 2:
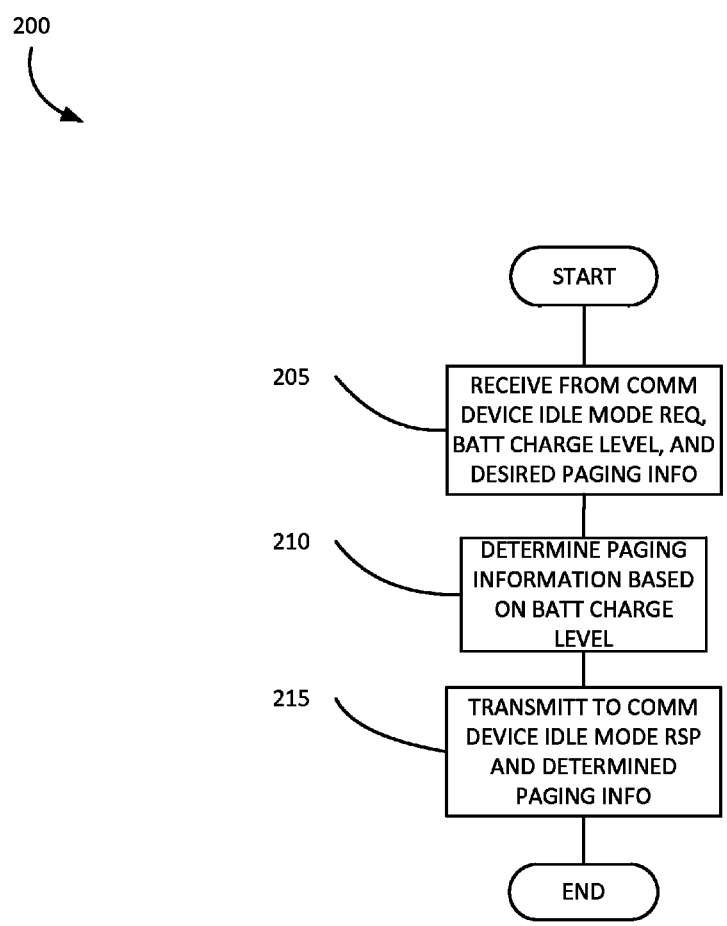
FIG. 2 includes a flowchart illustrating a process of an exemplary embodiment of the present teachings.

FIG. 2 illustrates a process 200 according to an exemplary embodiment for operating communication system 100. When a communication device is not in an active communication session (i.e., the communication device is not actively transmitting and/or receiving user communication on an assigned communication channel), the communication device may enter "idle mode" to, for example, save battery power. During idle mode, the communication device remains virtually turned off to consume minimal battery power and turns on periodically to, for example, check for paging messages from the communication system or provide a location update to the communication system. The interval between pages (i.e., the paging cycle), and the particular channel that may contain paging information for the communication device, is determined by a paging information (e.g., paging cycle and paging offset) that may be negotiated between the communication device and the communication system before the communication device enters idle mode.

When exiting idle mode to check for paging messages, if the communication device does not receive a paging message which requires the communication device to enter into a communication session, the communication device may re-enter idle mode without further communication with the communication system. If the communication device receives a paging message which requires the communication device to enter into a communication session, the communication device processes the paging message and acts accordingly.

In the present exemplary embodiment, at step 205 of process 200, network element 126 of communication system 106 receives at least one message including an idle mode request, a battery charge level of a battery of communication device 102, and a desired paging information, from communication device 102. The battery charge level comprises an indication of how much power is left in the battery of the communication device and may include a measure of time the communication device may operate under the remaining battery power, a percentage of the maximum capacity of the battery remaining in the communication device battery, or any other format in which such information may be provided. The desired paging information may include the paging cycle at which the communication device wishes to wake up from an idle mode to check for possible paging messages from communication system 106.

At step 210, network element 126 determines the paging information for the communication device based on the battery charge level. Determining the paging information may include, for example, comparing the battery charge level to a communication system-determined criteria and assigning paging information accordingly, translating the battery charge level to a corresponding paging information, or any other method of matching a battery charge level to a paging information. At step 215, network element 126 transmits the determined paging information to communication device 102.

In the present exemplary embodiment, a communication device transmits an idle mode request to a serving communication system including a battery charge level of its battery. The communication system, in response, determines an appropriate paging cycle for the communication device based on the battery charge level. The present exemplary embodiment allows the communication system to optimize the paging cycle for paging an idle communication device based on the battery charge level of the communication device. This may allow the communication system, for example, to assign a longer paging cycle to the communication device when the communication device reports a low battery charge level and a shorter or average paging cycle when the communication device reports a high battery charge level.

Figure 3:
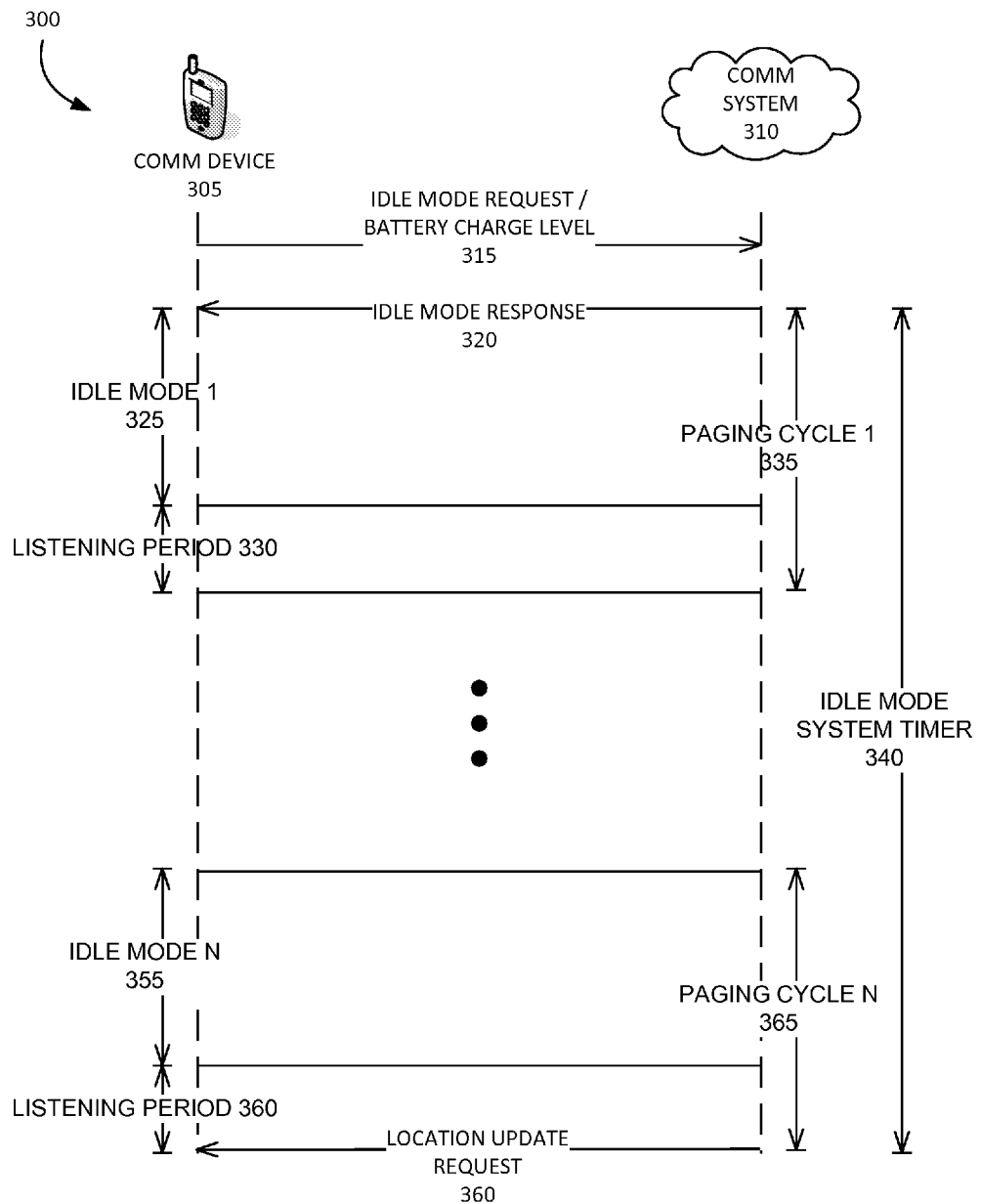
FIG. 3 includes a message sequence chart illustrating a process of an exemplary embodiment of the present teachings.

FIG. 3 depicts a message sequence chart 300 illustrating certain aspects of the present teachings. Message 315 comprises an idle mode request message from communication device 305 to communication system 310 including a desired paging information and a current battery charge level for the communication device. As an example, and not as limitation, in a WiMAX-compatible system, message 315 may comprise a deregistration request message.

In response, message 320 comprises an idle mode response message from communication system 310 to communication device 305 including paging information determined based on the current battery charge level. As an example, and not as limitation, in a WiMAX-compatible system, message 320 may comprise a deregistration command message.

Communication device 305 sets an idle mode timer based on the paging information received on idle mode response 320 and enters idle mode 1 (325). When the idle mode timer expires, communication device 305 exits idle mode 1 and listens to the paging channel for a period of time (listening period 330). When communication device 305 does not receive a page from communication system 310, communication device 305 re-enters idle mode. The idle mode 1 and listening period repeats until the communication device 305 receives a page from communication system 310 or the idle mode system timer expires (period 340).

When idle mode system timer expires, communication system 310 sends a message to communication device 305 prompting communication device 305 to exit idle mode. As an example, and not as limitation, in a WiMAX-compatible system, message 360 may comprise a request for a location update.

In the present exemplary embodiment, a communication device transmits an idle mode request to a serving communication system including a battery charge level of its battery. The communication system, in response, determines an appropriate paging cycle for the communication device based on the battery charge level. The present exemplary embodiment allows the communication system to optimize the paging cycle for paging an idle communication device based on the battery charge level of the communication device. This may allow the communication system, for example, to assign a longer paging cycle to the communication device when the communication device reports a low battery charge level and a shorter or average paging cycle when the communication device reports a high battery charge level.

Figure 4:
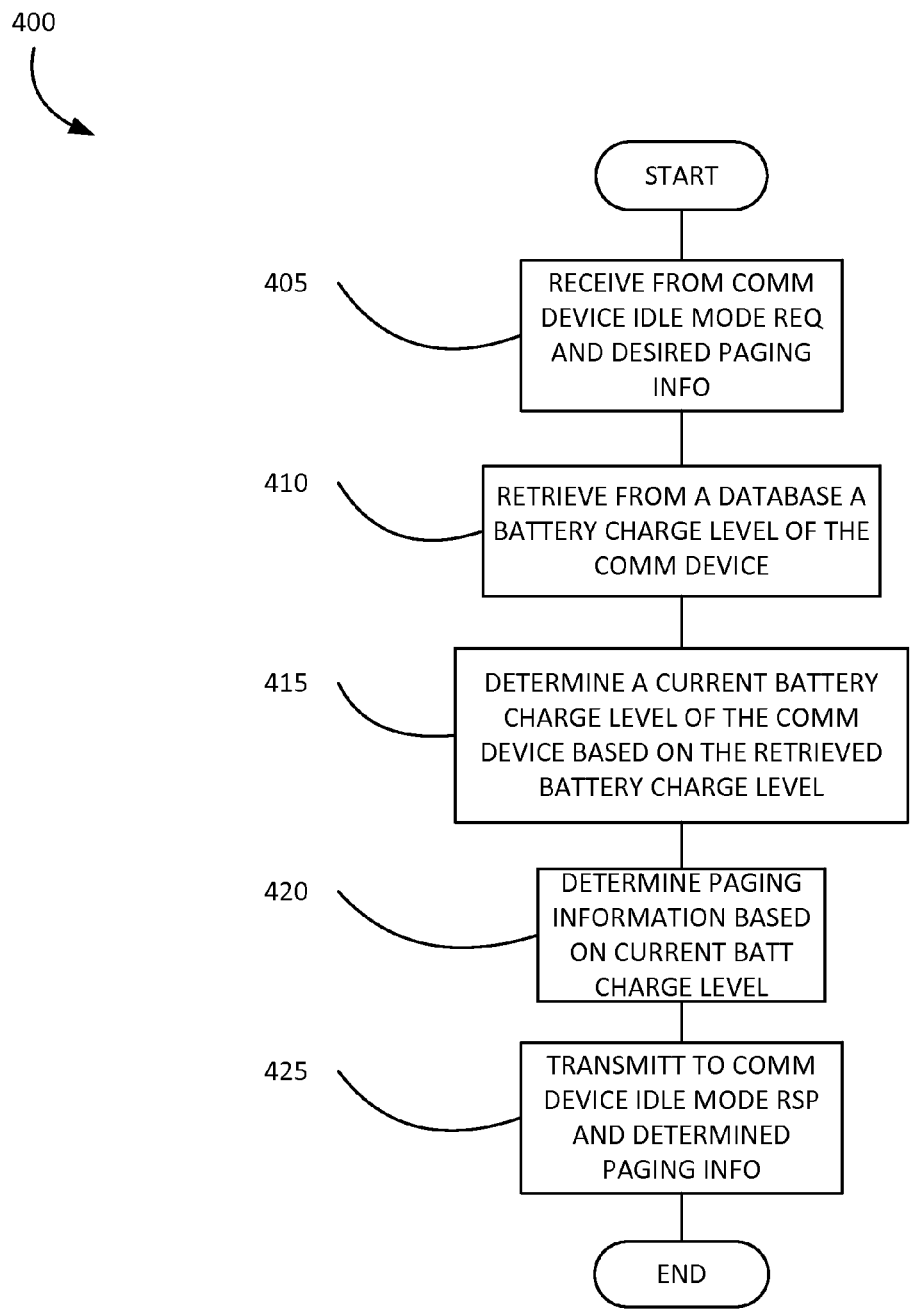
FIG. 4 includes a flowchart illustrating a process of another exemplary embodiment of the present teachings.

FIG. 4 illustrates a process 400 according to another exemplary embodiment for operating communication system 100. At step 405, network element 126 of communication system 106 receives at least one message including an idle mode request and a desired paging information from communication device 102. The desired paging information may include the paging cycle at which the communication device wishes to wake up from an idle mode to check for possible paging messages from communication system 106.

At step 410, network element 126 retrieves from a database a recorded battery charge level of the communication device. The database may reside in a storage unit of network element 126, in another element of communication system 106, or externally to communication system 106. The database may obtain battery charge levels from some or all of the communication devices served by communication system 106 through responses to communication system 106 requests for such information or through communication device-initiated reports. Each entry in the database comprises an identifier for a communication device, at least one battery charge level, and the time at which each battery charge level was reported by the communication device.

At step 415, network element 126 determines a current battery charge level of the communication device based on at least the retrieved battery charge level, the period of time between the recording of the retrieved battery charge level and the current time, and information about the efficiency of the battery and/or the communication device. For example, if the retrieved battery charge level was recorded 10 minutes before the current time and the efficiency of the battery and/or the communication device is high, the current battery charge level may be slightly less than the retrieved battery charge level. On the other hand, if the retrieved battery charge level was recorded one full day before the current time, the current battery level may be significantly lower than the retrieved battery charge level.

A person of ordinary skill in the art will appreciate that estimating a current battery charge level based on at least the retrieved battery charge level, the period of time between the recording of the retrieved battery charge level and the current time, and the power efficiency of the battery and the communication device may be accomplished by a plurality of known methods. For example, to determine a current battery charge level, multiple previously-recorded battery charge levels may be subject to a linear regression analysis, an analysis based on depletions levels of an optimum battery on the communication device, or a depletion model based on previous measurements to the battery of the communication device, without departing from the spirit of the present teachings. Thus, a detailed description of all possible estimation methods is omitted to not obscure the present teachings.

At step 420, network element 126 determines the paging information for the communication device based on the determined battery charge level. Determining the paging information may include, for example, comparing the determined battery charge level to a communication system-determined criteria and assigning paging information accordingly, or translating the determined battery charge level to a corresponding paging information. At step 425, network element 126 transmits the determined paging information to communication device 102.

In the present exemplary embodiment, a communication device transmits an idle mode request to a serving communication system. The communication system, in response, determines an appropriate paging cycle for the communication device based on at least a previously-recorded battery charge level of the communication device, the power efficiency of the device, and the power efficiency of the battery. The present exemplary embodiment allows the communication system to optimize the paging cycle for paging an idle communication device based on the estimated battery charge level of the communication device. This may allow the communication system, for example, to assign a longer paging cycle to the communication device when it determines that the battery charge level of the communication device is low and a shorter or average paging cycle when it determines that the battery charge level of the communication device is high.

Figure 5:
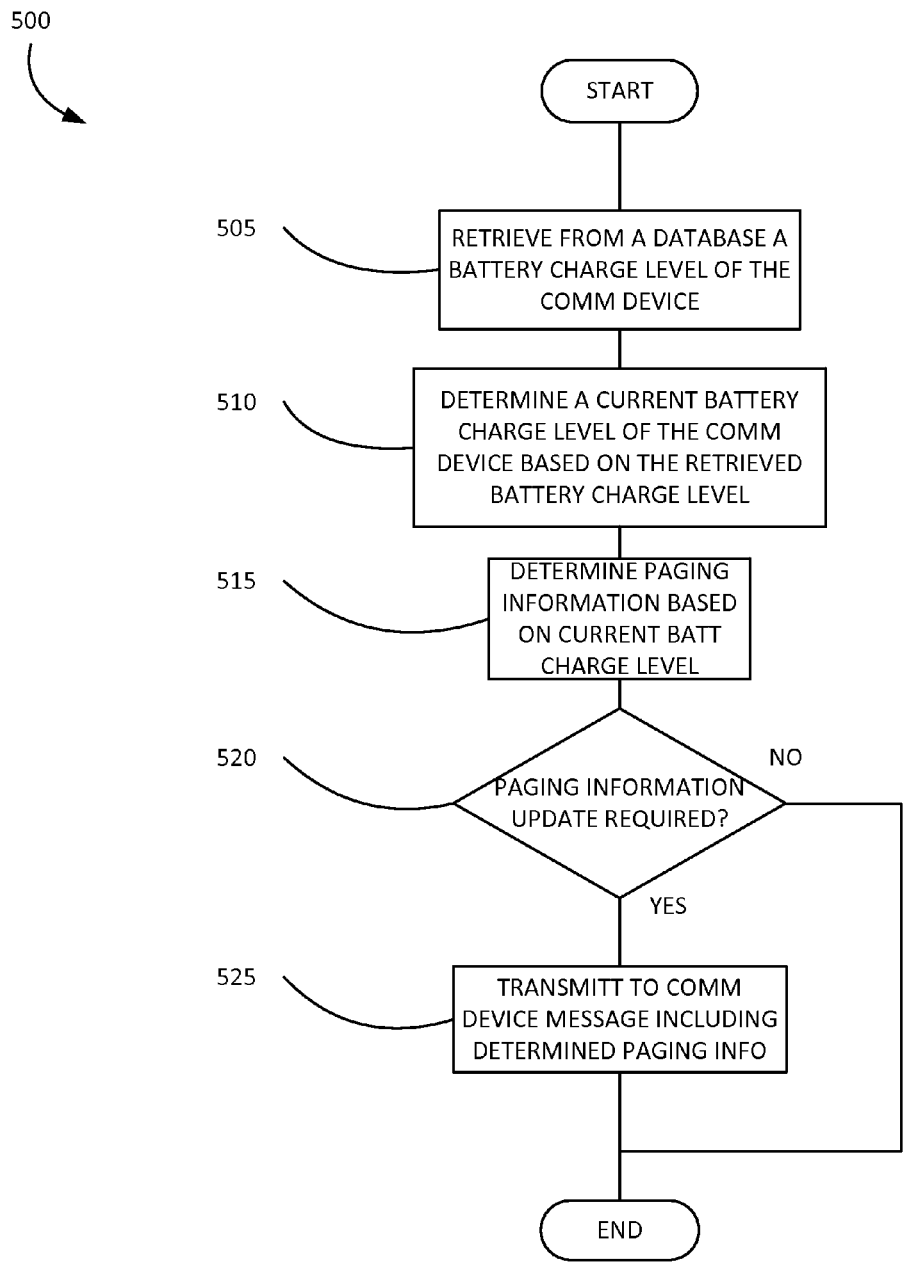
FIG. 5 includes a flowchart illustrating a process of yet another exemplary embodiment of the present teachings.

FIG. 5 illustrates a process 500 according to another exemplary embodiment for operating communication system 100. In some communication systems, a communication device served by the communication system may maintain an idle mode timer and the communication system may maintain an idle mode system timer associated with the communication device. The idle mode timer relates to a time interval the communication device may remain idle before having to check for a paging message from the communication system. The idle mode system timer relates to a time interval the communication system will allow the communication device to remain idle before having to provide a location update and demonstrate continued network presence. Generally, the idle mode timer is less than the idle system timer.

During idle mode, the communication device minimizes power consumption, but may not completely turn off since it needs to periodically check for possible paging messages from the communication system. Therefore, even while in idle mode, the battery charge level may fall below a communication system-determined criteria before the idle mode system timer expires, in which case, it may be desirable to renegotiate the paging information between the communication device and the communication system.

In the present embodiment, communication device 102 and communication system 106 have already negotiated paging information and communication device 102 has already entered idle mode. At step 505, network element 126 retrieves from a database a battery charge level of the communication device. Retrieval from the database may be triggered by expiration of an idle mode-related timer which would trigger when the communication device has been in idle mode for a predetermined period of time but before expiration of the idle mode system timer. The database may reside in a storage unit of network element 126, in another element of communication system 106, or externally to communication system 106. The database may obtain battery charge levels from some or all of the communication devices served by communication system 106 through responses to communication system 106 requests or through communication device-initiated reports. Each entry in the database comprises an identifier for a communication device, at least one battery charge level, and the time at which each battery charge level was reported by the communication device.

At step 510, network element 126 determines a current battery charge level of the communication device based at least on the retrieved battery charge level, the period of time between the recording of the retrieved battery charge level and the current time, and information about the efficiency of the battery and/or the communication device. For example, if the retrieved battery charge level was recorded 10 minutes before the current time and the efficiency of the battery and/or the communication device is high, the current battery charge level may be similar or slightly less than the retrieved battery charge level. On the other hand, if the retrieved battery charge level was recorded one full day before the current time, the current battery level may be significantly lower than the retrieved battery charge level.

A person of ordinary skill in the art will appreciate that estimating a current battery charge level based on at least the retrieved battery charge level, the period of time between the recording of the retrieved battery charge level and the current time, and the power efficiency of the battery and the communication device may be accomplished by a plurality of known methods. For example, to determine a current batter charge level, multiple previously-recorded battery charge levels may be subject to a linear regression analysis, an analysis based on depletions levels of an optimum battery on the communication device, or a depletion model based on previous measurements to the battery of the communication device, without departing from the spirit of the present teachings. Thus, a detailed description of all possible estimation methods is omitted to not obscure the present teachings.

At step 515, network element 126 determines the paging information for the communication device based on the determined battery charge level. Determining the paging information may include, for example, comparing the battery charge level to a communication system-determined criteria and assigning paging information accordingly, or translating the battery charge level to a corresponding paging information.

At step 520, network element 126 compares the determined paging information to the paging information currently assigned to communication device 102. When an update to the paging information is not required (NO), the process ends. When an update to the paging information is required (YES), network element 126 transmits the determined paging information to communication device 102.

An update to the paging information may be required when the determined paging information is different than the previously-assigned paging information. On the other hand, an update to the paging information may be required when the determined paging information is different than the previously-assigned paging information by a predetermined amount of time. Updating the paging information may include additional intermediate steps, such as paging the communication device during a listening period and including the paging information in the page, or paging the communication device to request the device to exit idle mode and renegotiate the paging information (by, for example, requesting a location update).

In the present exemplary embodiment, a communication system determines that the battery charge level of a communication device in idle mode may have been reduced during idle mode to a level which may require an extension of the paging cycle. The present exemplary embodiment allows the communication system to optimize the paging cycle for paging the communication device based on the estimated battery charge level of the communication device. This may allow the communication system, for example, to assign a longer paging cycle to the communication device than that currently being observed when it determines that the battery charge level of the communication device has been reduced by a pre-determined amount.

Figure 6:
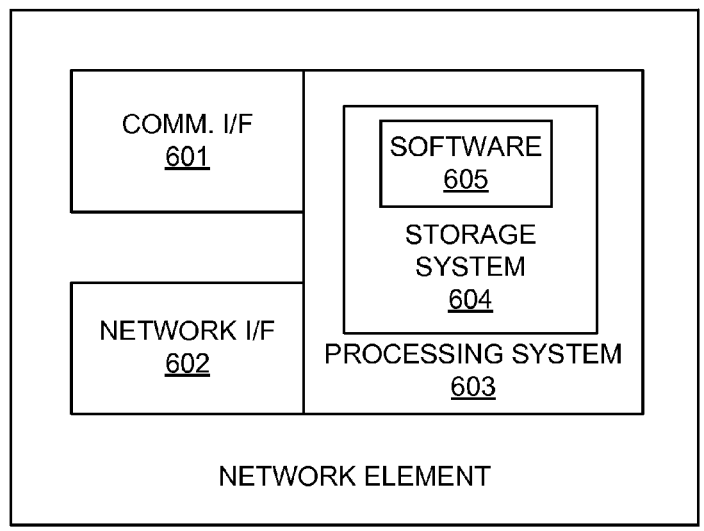
FIG. 6 includes a network element of an exemplary embodiment of the present teachings.

FIG. 6 illustrates a network element 600 according to the present teachings. Network element 600 is an example of network element 128 of FIG. 1, and thus, is comprised in a communication system such as communication system 106 described above with respect to FIG. 1. Network element 600 includes a communication interface 601 to communicate with one or more elements of the communication system, such as access nodes 120-122 of FIG. 1 through internal network 124 of FIG. 1. Network element 600 further includes network interface 602 to communicate with other networks, such as external network 108 of FIG. 1.

Network element 600 further includes processing system 603, which is linked to communication interface 601 and network interface 602. Processing system 603 includes processing circuitry for executing software 605 and storage system 604 to stores software 605. Network element 600 may further include other well-known components such as a power management unit, a control interface unit, etc., that are not shown for clarity.

Processing system 603 may include a microprocessor and other circuitry that retrieves and executes software 605 from storage system 604. Storage system 604 may include a disk drive, flash drive, data storage circuitry, or some other memory apparatus. Processing system 603 is typically mounted on a circuit board that may also hold storage system 604 and portions of communication interface 601 and network interface 602. Software 605 may include computer programs, firmware, or some other form of machine-readable processing instructions. Software 605 may also include an operating system, utilities, drivers, network interfaces, applications, or some other type of software. When executed by processing system 603, software 605 directs processing system 603 to operate network element 600 as described herein for network element 128.

Some or all of the actions performed by the exemplary embodiments described herein can be performed under the control of a computer system executing computer-readable codes embedded on a computer-readable recording medium or on communication signals transmitted through a transitory medium. The computer-readable recording medium may include any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. The communication signals transmitted through a transitory medium may include, for example, signals which modulate carrier waves transmitted through wired or wireless transmission paths.

The above description and associated figures explain the best mode of the present teachings. Other embodiments will be apparent to those skilled in the art from consideration of the specification and practice of the teachings disclosed herein. It is intended that the specification and examples be considered as exemplary only, with a true scope and spirit present teachings being indicated by the following claims.

What is claimed is:

1. A method of managing the paging cycle of a communication device comprising:
   receiving, from a communication device at an element of a communication system, at least one message comprising an idle mode request, a battery charge level of a battery of the communication device, and a desired paging information from the communication device;
   determining, at the element of the communication system, a paging information for the communication device based on the battery charge level; and
   transmitting, by the element of the communication system, a response message comprising the determined paging information to the communication device.

2. The method of claim 1, wherein determining the paging information for the communication device comprises selecting a first paging cycle when the battery charge level meets a charge level criteria and selecting a second paging cycle when the battery charge levels does not meet the charge level criteria, and the second paging cycle is longer than the first paging cycle.

3. The method of claim 2, wherein the charge level criteria comprises a predetermined percentage of the maximum capacity of the battery of the communication device and the predetermined percentage is selected by a network operator of the communication system.

4. The method of claim 2 wherein the charge level criteria comprises 50% of the maximum capacity of the battery of the communication device.

5. The method of claim 1, wherein
   the communication system comprises a wireless communication system,
   the at least one message comprises a deregistration request,
   the response message comprises a deregistration command, and
   the element of the communication system comprises a processing unit configured to perform a network control and management system abstraction layer to determine the paging information for the communication device.

6. A method of managing the paging cycle of a communication device comprising:
   receiving, from a communication device at an element of a communication system, at least one message comprising an idle mode request and a desired paging information from the communication device;
   retrieving, by the element of the communication system, a battery charge level of the communication device recorded at a previous time from a database of the communication system;
   determining, by the element of the communication system, a paging information for the communication device based on the battery charge level of the communication device; and
   transmitting, by the element of the communication system, a response message comprising the determined paging information to the communication device.

7. The method of claim 6, wherein determining a paging information for the communication device comprises selecting a first paging cycle when the battery charge level meets a charge level criteria and selecting a second paging cycle when the battery charge levels does not meet the charge level criteria, and the second paging cycle is longer than the first paging cycle.

8. The method of claim 7, wherein the charge level criteria comprises a predetermined percentage of the maximum capacity of the battery of the communication device and the predetermined percentage is selected by a network operator of the communication system.

9. The method of claim 6, wherein determining the paging information for the communication device comprises:
   determining an updated battery charge level of the of the communication device based on the battery charge level of the communication device recorded at the previous time and a difference between the previous time and the current time;
   selecting a first paging cycle when the battery charge level meets a charge level criteria; and
   selecting a second paging cycle when the battery charge levels does not meet the charge level criteria, wherein the second paging cycle is longer than the first paging cycle.

10. The method of claim 9, wherein the charge level criteria comprises a predetermined percentage of the maximum capacity of the battery of the communication device and the predetermined percentage is selected by a network operator of the communication system.

11. The method of claim 6, wherein
   the communication system comprises a wireless communication system, the at least one message comprises a deregistration request,
the response message comprises a deregistration command, and
the element of the communication system comprises a processing unit configured to perform a network control and management system abstraction layer to determine the paging information for the communication device.

12. An element of a communication system comprising:
a communication interface configured to communicate with a communication device; and
a processing unit, coupled to the communication interface, configured to:
receive from the communication device at least one message comprising an idle mode request and a desired paging information from the communication device;
determine a paging information for the communication device based on a battery charge level of the communication device; and
transmitting through the communication interface a response message comprising the determined paging information to the communication device.

13. The element of claim 12, wherein determining the paging information for the communication device comprises selecting a first paging cycle when the battery charge level meets a charge level criteria and selecting a second paging cycle when the battery charge levels does not meet the charge level criteria, and the second paging cycle is longer than the first paging cycle.

14. The element of claim 13, wherein the at least one message further comprises the battery charge level of the communication device.

15. The element of claim 14, wherein the charge level criteria comprises a predetermined percentage of the maximum capacity of the battery of the communication.

16. The element of claim 15, wherein
the communication system comprises a wireless communication system,
the at least one message comprises a deregistration request,
the response message comprises a deregistration command, and
the processing unit is further configured to perform a network control and management system abstraction layer to determine the paging information for the communication device.

17. The element of claim 13, wherein determining the paging information for the communication device comprises:
retrieving, by the element of the communication system, a recorded battery charge level of the communication device recorded at a previous time from a database of the communication system; and
determining the battery charge level of the of the communication device based on the recorded battery charge level and a difference between the previous time and the current time.

18. The element of claim 17, wherein the charge level criteria comprises a predetermined percentage of the maximum capacity of the battery of the communication.

19. The element of claim 18, wherein
the communication system comprises a wireless communication system,
the at least one message comprises a deregistration request,
the response message comprises a deregistration command, and
the processing unit is further configured to perform a network control and management system abstraction layer to determine the paging information for the communication device.

* * * * *